E. W. DAVIS.
CUSHIONED VEHICLE AXLE.
APPLICATION FILED APR. 21, 1913.
1,113,545. Patented Oct. 13, 1914.
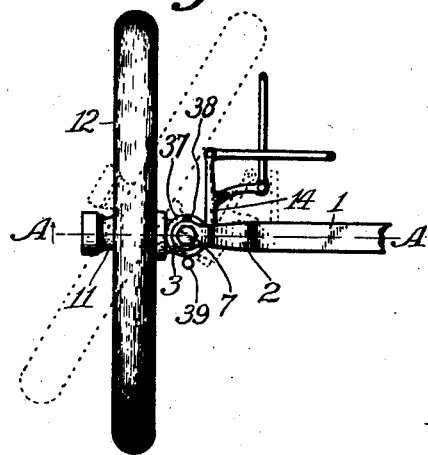
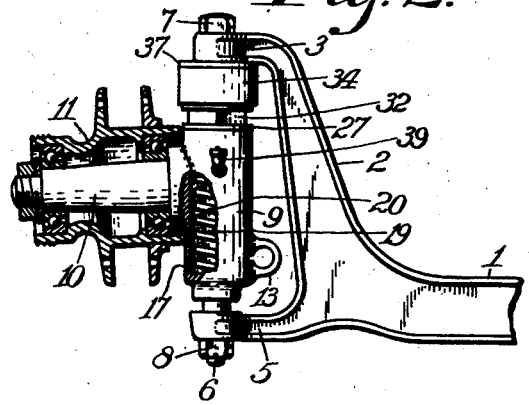
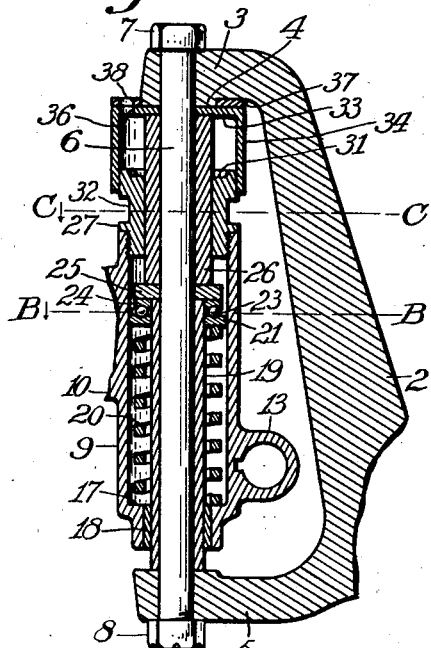
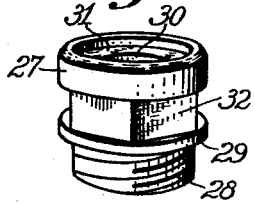
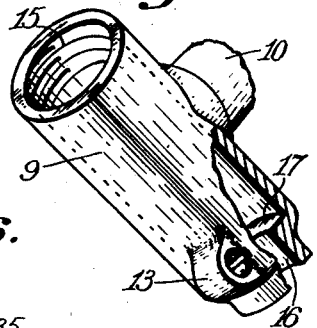
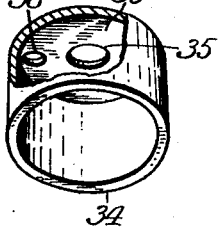
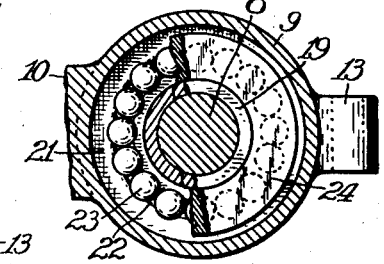
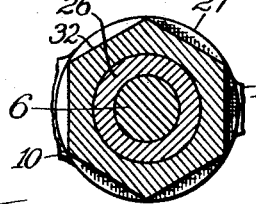
WITNESSES:
J. H. Gardner
M. L. Wilhelm
INVENTOR:
Edward W. Davis,
BY
E. T. Silvius,
ATTORNEY.

UNITED STATES PATENT OFFICE.

EDWARD W. DAVIS, OF INDIANAPOLIS, INDIANA.

CUSHIONED VEHICLE-AXLE.

1,113,545.  Specification of Letters Patent.  Patented Oct. 13, 1914.

Application filed April 21, 1913. Serial No. 762,637.

*To all whom it may concern:*

Be it known that I, EDWARD W. DAVIS, a citizen of the United States, residing at Indianapolis, in the county of Marion and State of Indiana, have invented a new and useful Cushioned Vehicle-Axle, of which the following is a specification, reference being had to the accompanying drawings, and to the letters and figures of reference marked thereon.

The present invention relates to cushions for knuckle-jointed steering axles, the invention having reference more particularly to a cushion connected with the knuckle-joint of axles of the type commonly used in the construction of automobiles or similar vehicles.

An object of the invention is to provide a strong and reliable cushioned vehicle axle that shall be so constructed as to permit the cushion to be arranged as closely as possible to the steering-wheel.

A further object is to provide a cushioned steering axle of such construction as to be durable and economical and not liable to derangement in use.

With the above mentioned and other objects in view, the invention comprises a stub-axle provided with a cushioned spring and a novel housing therefor adapted to be connected to the popular type of main axle bar.

The invention consists also in the novel parts and in the combinations and arrangements of parts as hereinafter particularly described and further pointed out in the accompanying claims.

Referring to the drawings, Figure 1 is a top plan of one end portion of an automobile steering axle provided with the improvement as preferably constructed and supported by a wheel; Fig. 2 is a sectional elevation of Fig. 1 omitting a portion of the wheel; Fig. 3 is a vertical section of the improvement on the line A A in Fig. 1; Fig. 4 is a perspective view of one of the parts of the invention; Fig. 5 is a perspective view of the main part of the housing of the cushion partially broken away, being a portion of the stub-axle; Fig. 6 is a perspective view of a dust-cap preferably provided for protecting the knuckle-joint; Fig. 7 is a section approximately on the line B B in Fig. 3; and Fig. 8 is a section on the line C C in Fig. 3.

In the different figures of the drawings similar reference characters indicate like parts or features of construction herein referred to and described.

One steering-wheel and knuckle only is shown in the drawings as being sufficient to clearly illustrate the invention, it being well known that in automobiles two steering-wheels are commonly connected to one axle bar. In the present case the axle bar 1 may be variously formed and each end thereof has an upwardly extending portion 2 from which extends a relatively horizontal ear 3 having a projecting boss 4 on its under side, an ear 5 extending from the lower portion of the axle bar so as to be opposite the ear 3. A pivot bolt 6 is fitted into suitable openings and extends through the ears 3 and 5, and it has a head 7 thereon that is seated upon the top of the ear 3, a nut 8 being screwed onto the lower end of the bolt against the under side of the ear 5, which arrangement practically binds the two ears together and particularly prevents the ear 3 from being forced relatively away from the ear 5. A hollow cylindrical housing part 9 is provided which constitutes a steering head having a suitable stub-axle 10 on one side thereof on which the hub 11 of a suitable wheel 12 is rotatably mounted, the stub-axle being relatively near the normal upper end of the housing part or head. The head has a boss 13 on the opposite side of the normal lower portion thereof to which a steering arm 14 is secured. The upper portion of the housing or head has internal screw-threads 15 therein and the lower portion has a cylindrical bore 16 therein that is somewhat less in diameter than the remainder of the housing, so that an upward facing shoulder or ledge 17 is formed within the housing so as to extend about the upper end of the bore, the latter preferably having a removable bushing 18 therein in order that lost motion due to wear may be compensated for by replacing a worn bushing with a new one. A sleeve 19 is placed on the pivot bolt 6 in contact with the upper side of the ear 5 and it extends upward a suitable distance through the bushing 18, the sleeve being closely fitted in the bushing and on the pivot bolt. A coil spring 20 of suitable length is provided which extends about the sleeve and is seated upon the ledge 17 and is inclosed in the housing. A suitable ball-bearing plate 21 is seated upon the top of the spring and extends about the sleeve 19 and approximately to the wall of the housing 9, the normal upper side of the plate having a ball race 22 therein in which are a suitable number of bearing balls 23, and upon the balls a similar plate 24 is placed and supported, the plate 24 preferably being slightly less in diameter than the internal diameter of the housing, so as to permit the passage of oil downward to the balls.

A washer 25 preferably is placed upon the upper end of the sleeve 19 and upon the top of the plate 24, being practically a foot plate of a sleeve 26 which is supported on the top thereof and extends about the pivot bolt 6 and upward nearly to the boss 4. The housing includes a cylindrical head 27 which is provided with external screw-threads 28 that screw into the upper end of the cylindrical portion 9, the threaded portion being somewhat less in diameter than the body portion of the head, so that the latter has a shoulder 29 that is seated upon the part 9. The head has a bore 30 which receives the sleeve 26 and is movably guided on the sleeve. Preferably the upper end of the head has an annular recess 31 forming an oil-way from which to lubricate the exterior of the sleeve 26. The middle portion of the head has facets 32 recessed in the exterior portion of the head so as to constitute practically a hexagonal nut to which a wrench may be applied. Preferably the external diameter of the removable part 27 is equal to the external diameter of the main part 9.

Preferably a dust-cap is provided which comprises a top plate 33 and a depending flange or rim portion 34 that is slightly greater in diameter internally than the part 27 externally, the upper portion of the housing part 27 extending movably into the rim 34, the plate 33 of the dust-cap having a central aperture 35 that receives the pivot bolt 6, the plate being placed upon the top of the sleeve 26 and directly under the boss 4. The combined length of the sleeve 19, the washer 25, the sleeve 26 and the top 33 of the dust-cap is equal to the length of the space between the boss 4 and the ear 5 between which those parts are closely held by means of the pivot bolt. The top 33 has an aperture 36 therein through which oil or grease may be inserted. An annular cover 37 is placed upon the top plate 33 and extends about the boss 4 to be rotatably guided thereby, and it has an oil-hole 38 therein to be brought to the aperture 36 for inserting lubricant into the dust-cap which performs the function of an oil box. The cover 37 when rotated and stopped in proper position covers the aperture 36. Preferably an oil cup 39 is connected to the main part 9 of the housing relatively close to the upper portiton thereof for feeding lubricant to the bearings upon the spring.

It will be observed that the sleeve 19, the washer 25 and the sleeve 26 are all practically fixed each with respect to the other and act as a unitary element which preferably, although not necessarily, is formed in sections or different parts as described as a matter of mechanical expediency and in the interest of economy in construction, the upper portion or sleeve 26 having a relatively thicker wall than the lower portion or sleeve 19, so as to safely sustain a load on the axle. Various modifications in the details may fairly be made within the scope of the appended claims.

In practical use the housing formed on the stub-axle 10 is carried thereby and supports the spring 20 which shortens and lengthens alternately when the wheel is moving over uneven roads, so that the sleeve 26 supported upon the spring moves vertically with respect to the guide part 27 or upper portion of the housing, the sleeve 19 being movably guided in the lower portion of the housing. The ear 3 being supported upon the sleeve 26 mainly carries the load placed upon the axle bar 1 but is assisted by the ear 5 and the pivot bolt 6 and the nut 8, so that neither ear is required to be awkwardly thick and strong as would be necessary if either one alone carried the load. On operation of the steering arm 14 the housing is guided rotatably on the sleeves 19 and 26 and turns relative to the dust-cap, the spring 20 being turned with the housing, but it should be understood that the structure may be modified so that the bearings may permit the spring to remain stationary with respect to the sleeve 26 if so desired.

Having thus described the invention, what is claimed as new is—

1. A cushioned axle including a hollow cylindrical supporting housing having a spring-seat therein, a coil spring supported upon the spring-seat, a hollow sleeve in the housing and supported by means of the spring, a steering arm fixedly connected to the housing, an axle-bar having an ear supported upon the sleeve and thereby mainly supporting the load of the axle bar, the latter having also an ear extending under the housing, and a pivot bolt secured to the ears and extending through the spring and the sleeve and enabling the two ears to jointly support the load.

2. A cushioned axle including a hollow cylindrical housing having a stub-axle on its side for support, the interior of the housing having a spring-seat therein, a coil spring seated upon the spring-seat, a bearing plate supported upon the spring, a hollow sleeve supported upon the bearing plate, a load supporting axle-bar having an ear supported upon the sleeve for mainly supporting a load and an ear extending under the lower end of the housing, and a pivot bolt extending through the ears and also through the spring and the sleeve and secured to the ears for enabling the two ears to jointly support the load.

3. A cushioned axle including a hollow cylindrical housing having a stub-axle and also a boss thereon, the housing having a spring-seat therein, a coil spring supported upon the spring-seat, a sleeve supported by means of the spring, a dust-cap supported upon the sleeve and extending about the upper portion of the housing, an axle-bar having an ear supported upon the dust-cap and an ear extending under the housing, and a pivot bolt secured to the ears and extending through the spring and the sleeve and also through the dust-cap.

4. A cushioned axle including a hollow cylindrical housing part having a supporting stub-axle on its side, the upper portion of the housing part having a cylindrical guide part removably secured thereto, the lower portion of the part having a spring-seat therein, a sleeve movably guided in the guide part of the housing, a spring supported upon the spring-seat and supporting the sleeve, an axle-bar having an ear supported upon the sleeve and an ear extending under the housing part, and a pivot bolt secured to the ears and extending through the spring and the sleeve.

5. A cushioned axle including a hollow cylindrical housing having a spring-seat in the lower portion thereof, a sleeve extending through and movably guided in the lower portion of the housing, a spring supported upon the spring-seat and extending about the sleeve, relatively movable bearing plates supported upon the spring and extending about the sleeve, a second sleeve supported upon the bearing plates and movably guided in the upper portion of the housing, a dust-cap supported upon the second sleeve and extending about the upper portion of the housing, an axle-bar having an ear that is seated upon the dust-cap and an ear that extends under the housing, and a pivot bolt secured to the ears and extending through the spring and the sleeves and also through the dust-cap.

6. In a cushioned steering axle, the combination of a hollow cylindrical housing uprightly arranged and having a spring seat in the lower portion thereof, the upper portion of the housing having a bored cylindrical guide part, the top of said part having an oilway extending about the bore therein, a sleeve movable in the bore of the guide part, a spring supported upon the spring-seat and supporting the sleeve, a dust-cap supported upon the sleeve and extending over the top and about the upper portion of the guide part, the top of the cap having an aperture therein, an axle-bar having an ear provided with a boss that is seated upon the dust-cap and an ear that extends under the housing, an annular plate upon the dust-cap extending about and rotatably guided by the boss and having an oil-hole therein, and a pivot bolt secured to the ears and extending through the spring and the sleeve and also through the top of said dust-cap.

7. In a cushioned steering axle, the combination with an axle-bar having two ears spaced apart, and a pivot bolt extending through and secured to the two ears, of a hollow cylindrical housing part extending about the bolt and having a supporting stub-axle and also a projection thereon, the lower portion of the housing part being movably guided by the bolt, a steering arm secured to the projection, a coil spring extending about the bolt and supported by the lower portion of the housing part, bearing devices supported upon the spring, a sleeve supported upon the bearing devices and extending about the bolt in contact therewith and supporting the uppermost one of said ears, an oil cup connected to said housing part above the plane of the bearing devices, and a cylindrical guide part screwed into the upper end of said housing part and movably guided on said sleeve, the guide part having facets thereon.

8. In a cushioned steering axle, the combination of a hollow cylindrical housing uprightly arranged and having a stub-axle on one side and a projection on the opposite side thereof, a steering arm secured to the projection, a coil spring supported in the lower portion of said housing, a sleeve movably guided in the lower portion of the housing and extending through the spring, a bearing plate extending about the upper portion of the sleeve and supported upon the spring, the upper side of said plate having a ball-race therein, balls in said ball-race, a top bearing plate extending about the upper portion of the sleeve and supported upon said balls, an axle member having a lower ear extending beneath said sleeve and an upper ear extending above said top bearing plate at a distance therefrom, hollow supporting means supported on and extending from said top bearing plate to said upper ear, and a pivot bolt secured to said ears and extending through the hollow supporting means and also through said sleeve.

In testimony whereof, I affix my signature in presence of two witnesses.

EDWARD W. DAVIS.

Witnesses:
 E. T. SILVIUS,
 CHARLES T. WILLIAMS.